United States Patent [19]

Lewis et al.

[11] 4,006,478
[45] Feb. 1, 1977

[54] SECURITY DEVICE

[76] Inventors: Bernard L. Lewis, 1673 Magnolia Ave., Winter Park, Fla. 32789; Dean D. Howard, 4230 Oak Lane, Oxon Hill, Md. 20021

[22] Filed: Aug. 15, 1958

[21] Appl. No.: 755,361

[52] U.S. Cl. .......................... 343/18 E; 343/117 R; 343/853

[51] Int. Cl.² .......................................... G01S 7/38

[58] Field of Search ............... 343/853, 854, 16.2, 343/18, 18.4, 16, 100, 18 E, 100 TD; 333/24 G

[56] References Cited

UNITED STATES PATENTS

| 2,461,005 | 2/1949 | Southworth | 343/18 |
|---|---|---|---|
| 2,810,908 | 10/1957 | Crawford et al. | 343/16 M |
| 2,849,689 | 8/1958 | Kock | 333/24 |
| 2,908,002 | 10/1959 | Van Atta | 343/100 TD |
| 2,931,033 | 3/1960 | Miller | 343/16 M |

Primary Examiner—Maynard R. Wilbur
Assistant Examiner—Richard E. Berger
Attorney, Agent, or Firm—R. S. Sciascia; Philip Schneider; Shelton McAnelly

EXEMPLARY CLAIM

1. In a signal jamming device, first and second transducers physically displaced relative to each other said transducers having substantially identical signal coupling characteristics on the basis of direction to a selected distant object, means for coupling said transducers whereby signals received by one transducer are emitted by the other and vice versa, and differential impedance means connected to said means for coupling for producing phase shift of signals emitted by one transducer relative to signals emitted by the other transducer.

7 Claims, 13 Drawing Figures

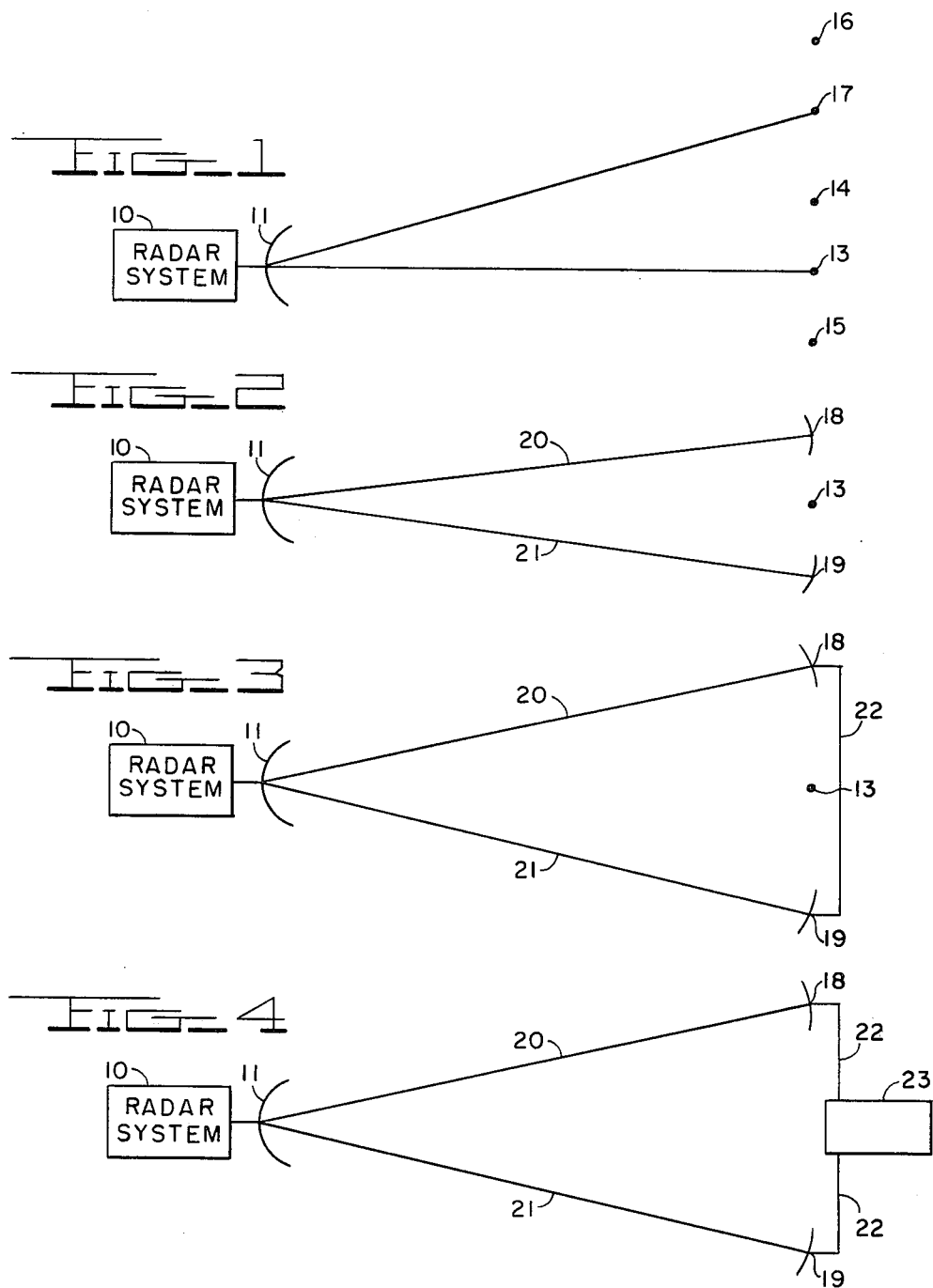

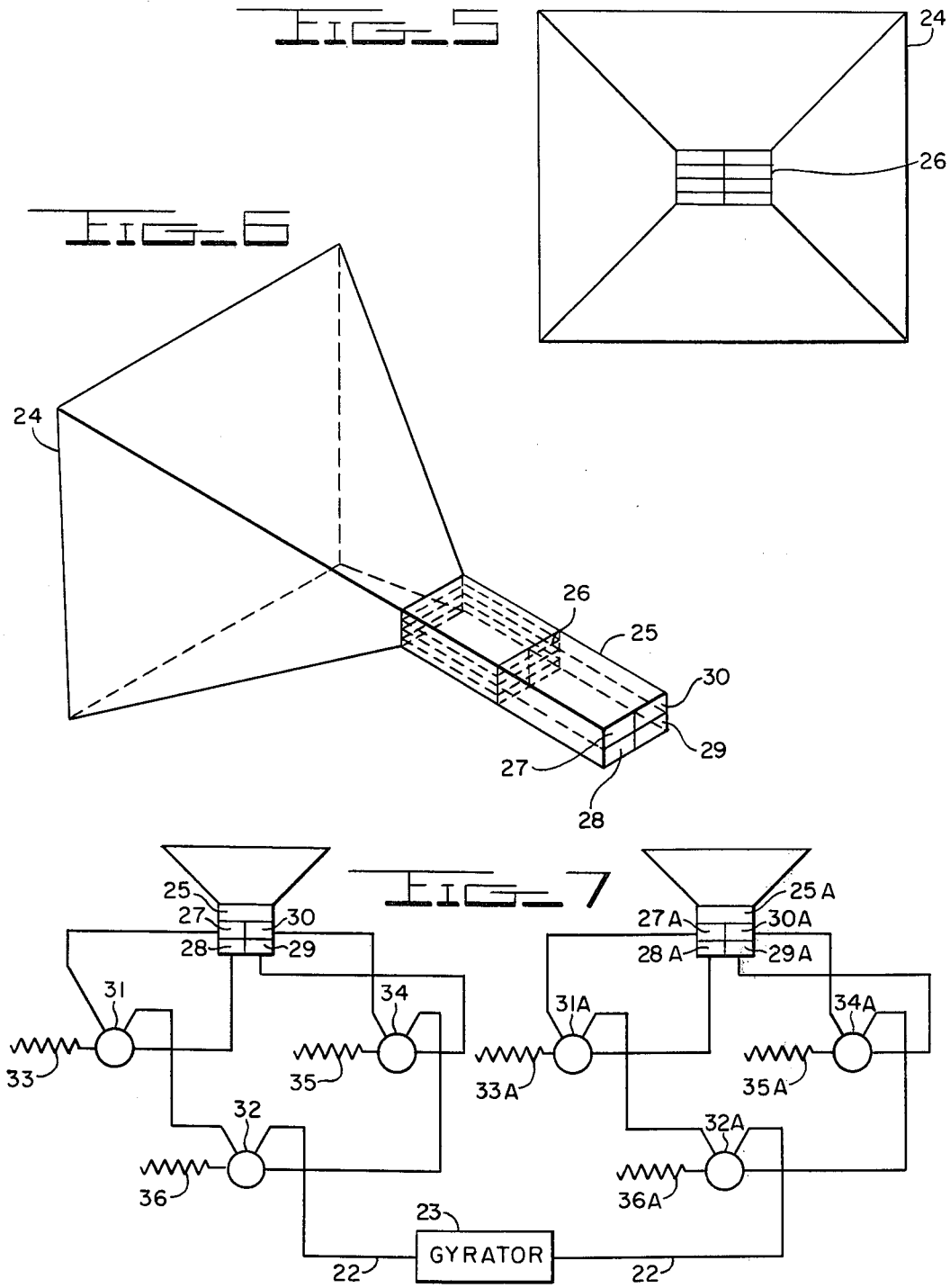

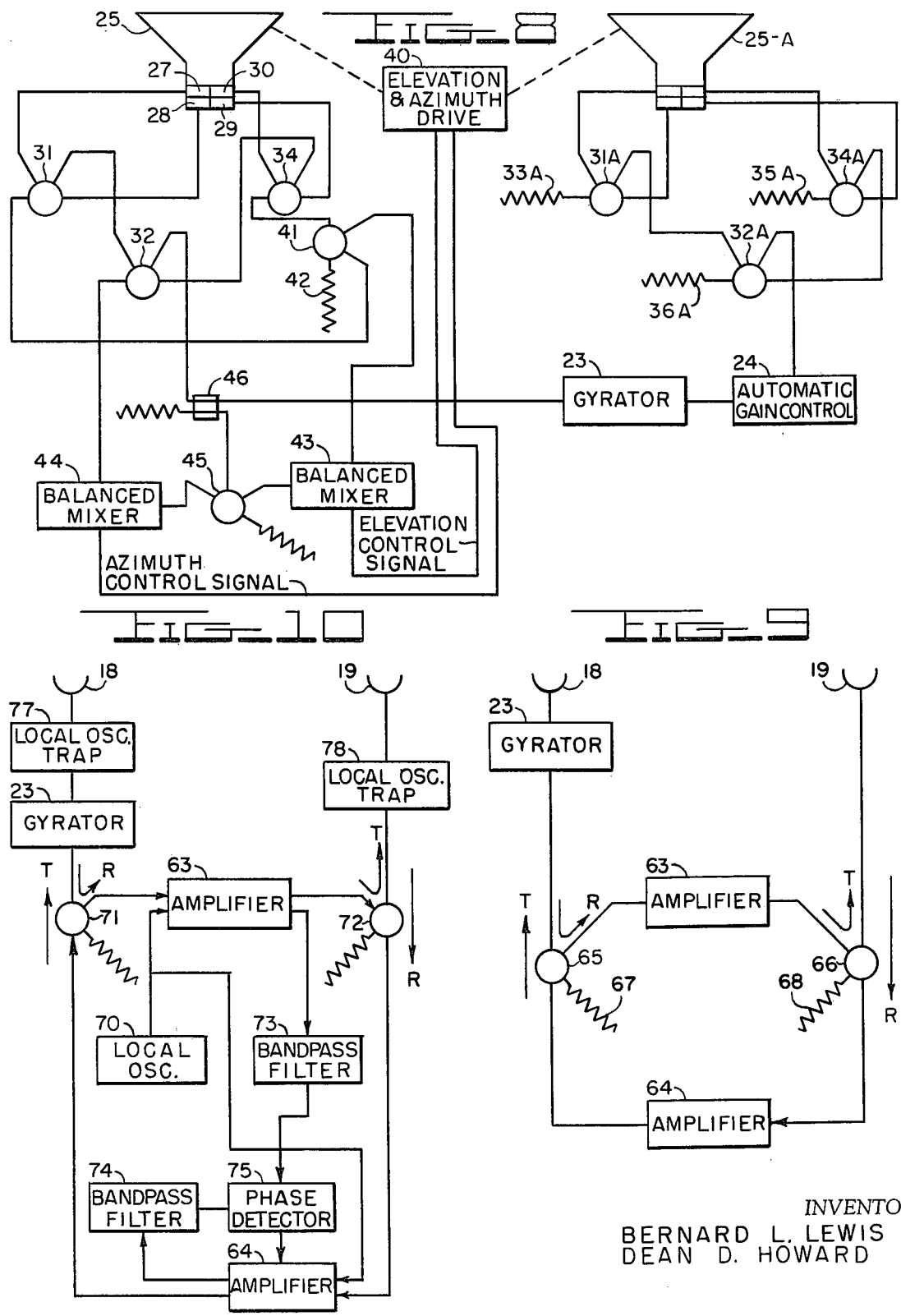

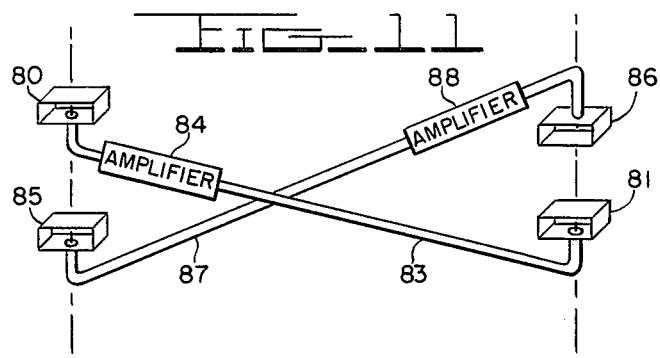
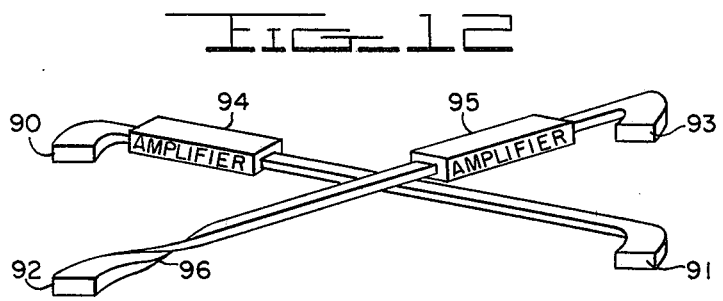
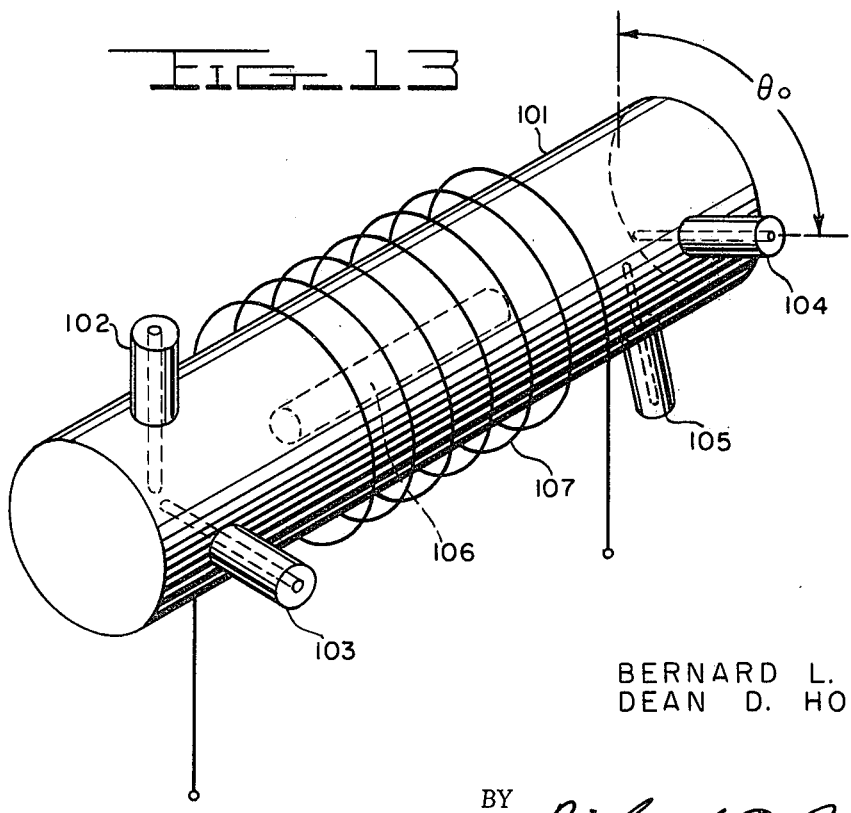

SECURITY DEVICE

The invention described herein may be manufactured and used by or for the Government of the United States of America for governmental purposes without the payment of any royalties thereon or therefor.

This invention relates in general to devices for denying to an enemy the effective use of object locating equipment and in particular to devices for providing controlled signals for interfering with tracking of a target object by a radar system.

Object locator apparatus has now become practically an integral part of every offensive or defensive military installation whether it be fixed or mobile and operative above or below the surface of the earth, however in many instances it is desirable to have equipment which will render such locator apparatus of any enemy ineffective so as to conceal one's movements. For simplicity such equipment could be termed merely jamming equipment or a security device. Jamming apparatus can assume many forms depending upon the complexity required to defeat anti-jamming measures taken by the enemy.

In general, certain types of locator systems of the typical radar type are more difficult to jam than others. It is for example comparatively easy to confuse a sequential lobing radar system to cause it to deliver erroneous directional information. Jamming of simultaneous lobing radar systems on the other hand is considerably more difficult, if not impossible, with prior art jamming equipment.

Accordingly, it is an object of the present invention to provide an apparatus which will render conventional detector systems such as radar and sonar ineffective to locate objects which would otherwise be within the effective range thereof.

It is another object of the present invention to provide a simple jamming device against the effective use of locator systems.

It is a further object of the present invention to provide a jamming device which emits energy to confuse the effective operation of the locator system but does so only in response to the reception of energy from a locator system.

It is a further object of the present invention to provide a jamming device for preventing the effective operation of a radar system by emitting energy having characteristics which cause the radar system to derive erroneous angular information relative to its targets.

Other and further objects and many of the attendant advantages of this invention will be readily appreciated as the same becomes better understood by reference to the following detailed description when considered in connection with the accompanying drawings wherein:

FIGS. 1–4 show various spatial arrangements of apparatus to facilitate explanation of the basic principles of the present invention.

FIGS. 5–6 show different views of an antenna structure particularly adaptable to the present invention.

FIG. 7 shows a passive, manually oriented jamming device.

FIG. 8 shows a passive system having automatic follow-up features.

FIG. 9 shows a simplified active jamming system embodying the teachings of the present invention.

FIG. 10 shows a more complex active jamming system containing automatic compensation for internal path length.

FIGS. 11 and 12 show alternate embodiments of features of the present invention.

FIG. 13 shows details of a component employed in the present invention.

In accordance with the basic features of the present invention an apparatus is provided which effectively alters the prearranged antenna two-way radiation pattern of an enemy radar system through the use of equipment mounted on a potential target in such a manner that the apparent center of the target is many yards away from the actual center of the target which would be obtained with the prearranged antenna radiation pattern. The magnitude of this displacement or alteration is controllable and even may be varied with time causing the introduction of large amounts of angular error or "noise" into the radar system to interfere with the effective angular tracking of the target. In various embodiments of this invention, apparatus arrangements are disclosed which simultaneously provide substantial protection from effective tracking by several radars or by single radar systems with different frequencies of operation and from a plurality of radars simultaneously or by frequency diversity radars.

This invention operates on the principle that the shape of the two-way antenna pattern of a radar system is dependent in part on the geometry of the target. For example, a radar system will normally receive a maximum amount of return energy from a small point source when the radar antenna is pointed directly at the source. However, if the target actually provides two unequal point sources separated in space and positioned so that their signals arrive at the radar antenna out-of-phase, the antenna will actually receive an indication of the largest total signal from the composite sources when it is pointed away from the individual sources themselves on the side of the strongest source. The distance between the center of the two point sources and the point from which the radar apparently receives the maximum signal will be a function of several factors such as the spatial separation of the two sources and the relative amplitudes of the signals emitted thereby but will be limited ultimately by the beam width of the radar antenna. For a specific example, if two sources have an amplitude ratio of 0.9, the apparent point of maximum signal will be displaced from the stronger of the two sources by an amount equal to nine times the spacing of the two sources and in a direction opposite to that of the weaker source from the stronger source.

With two such sources mounted on a target object whose normal echo is equal to or smaller than the resultant signal from the two sources, the radar system will indicate that the direction of this target object is somewhere between that of the actual target and the apparent center of the two point sources, thus the prearranged two-way radiation pattern of the radar antenna is distorted.

With particular reference now to FIG. 1 of the drawings, the relationships discussed above are indicated therein. A radar system 10 having a directive antenna 11 which typically may be used for both transmission and reception of return energy is pointed in the general direction of a point source 13 from which a return signal is received by the radar system. To the sides of the point source 13 additional point sources 14 and 15 are disposed typically with the signals reaching antenna 11 from point sources 14 and 15 having different relative amplitudes, phasing, or combination of the two.

With the signal from source 14 predominating, the apparent center of the point sources 14 and 15 may occupy a position such as that indicated by the point 16. Thus when this apparent signal combines with the actual reflected signal from point source 13, a resultant apparent point source 17 is obtained. The result will be that the antenna 11, which will normally be associated with a radar system 10 which has angular tracking facilities, will orient itself in the direction of point 17 causing it to give an entirely erroneous indication of the direction of point source 13 and may result in complete loss of tracking of the point source 13.

The character of the signals emitted by the point sources 14 and 15 requires careful attention, it normally being possible to vary the displacement of the apparent point source 16 from the actual point source 13 over a considerable amount, typically from zero to infinity, by varying the relative amplitudes of the signals from point sources 14 and 15 as well as their relative phasing. Typically with a phase relationship of 180° between the signals emitted at point sources 14 and 15, the displacement of apparent point 16 from the actual sources 14 and 15 may approach infinity.

In the case of a radar system it is of course clear that, for the foregoing relationships to be realized, the signals from the point sources 14 and 15 must not be dissimilar in duration, frequency, modulation or phase characteristics from those of the normal echo signal returned by a finite object which appears as the signal from point source 13. Where radar systems of different frequencies and modulation characteristics are encountered, it is apparent that the emission of any interfering signals from the point sources 14 and 15 must bear a definite relationship to the signals emitted by such radar systems 10.

As a step in providing such a relationship, the specific apparatus indicated in FIG. 2 will be discussed.

Again a radar system 10 with its directive antenna 11 is indicated which in general is pointing in the direction of a point source reflective object, such as an airplane, indicated by the point source 13. Disposed typically at the wing tips of the airplane are energy radiating devices indicated as reflectors 18 and 19 which can effectively provide the point sources of energy 14 and 15 of FIG. 1. By suitable design even comparatively small reflectors 18 and 19 can be caused to provide return signals which substantially exceed the normal echo of a comparatively poor reflector such as an airplane which provides the single point source 13. Such a basic system as FIG. 2, however, is subject to various practical limitations such, for example, as the practical impossibility of maintaining equality in the distance 20 between the antenna 11 and reflector 18 and the distance 21 between antenna 11 and the reflector 19, resulting in a phase modulation of the two return signals from reflectors 18 and 19 which interferes with the maintenance of a desired phase difference. In addition, the maintenance of a typical 180° phase relationship between the signals received at antenna 11 from reflectors 18 and 19 is a practical impossibility because of various effects such as the yaw of the airplane, tactical evasion maneuvers, and the like.

FIG. 3 indicates in elementary form a novel arrangement which avoids the path length difficulty discussed in connection with FIG. 2 by employing transmission paths which are identical in length regardless of relative variations in the distances 20 and 21. This is achieved by connecting the reflectors 18 and 19 together by means of a transmission line 22 in such fashion that energy received from antenna 11 by reflector 18 is directed through transmission line 22 for reradiation by reflector 19 to antenna 11. In a similar manner energy received by reflector 19 from antenna 11 is transmitted in the reverse direction through transmission line 22 for reradiation by reflector 18 to antenna 11. The result is two energy paths which at all times are of equal length, one from antenna 11 through path 21 to reflector 19, through transmission line 22 to reflector 18, through path 20 to antenna 11, and the second, the reverse thereof. This results in the production of two point sources 18 and 19 which return radar energy to antenna 11 which appears as the original point sources 14 and 15 of FIG. 1.

The apparatus of FIG. 3 of course, does not meet all the requirements previously outlined in that the signals received at antenna 11 from the reflectors 18 and 19 are in phase and of substantially the same amplitude. However, the requirements previously discussed, namely that the desired dissimilarities of amplitude and phase exist, is obtained through the apparatus of FIG. 4 which is similar to the apparatus of FIG. 3 except for the addition thereto of a nonreciprocal device 23 which presents different phase shift to signals traveling therethrough in opposite directions. Such a device is described in greater detail at a subsequent point in the specification. For the present, however, suffice it to say that the device provides direction sensitive attenuation and phase shift of energy traveling through transmission line 22.

The apparatus of FIG. 4 is entirely passive, that is, it does not produce any radio frequency energy of its own accord. This device merely reradiates received energy which originated at some distant radar system 10 so that there is no particular problem connected with the maintenance of return energy possessing the same characteristics as the energy emitted by radar system 10 nor is there any possibility of the system producing radio frequency energy in the absence of received energy which a simple passive homing system of an enemy could detect. The system of FIG. 4 is subject to certain limitations however, because in order to obtain adequate gain to overcome system losses and provide the differential amplitude output required, the reflectors or antennas 18 and 19 must be made directive. Typically these reflectors may have a one-way 3-db beamwidth of approximately 7.5° at X-band or approximately a 4° two-way 3-db beamwidth of 4° would appear to be a very small sector of space over which an enemy radar system could be adversely affected but in practice attack is most probable from only small sectors depending upon the nature of the attack. For example, an interceptor attempting to shoot down another aircraft may try to close on the tail of its target. Thus a single security system such as that described in the foregoing could provide tail defense with the reflectors 18 and 19 pointing in an aft direction. Another example of sectors of attack would be where an aircraft on the offensive is attempting to strike an enemy task force or ship. In this case the aircraft would be subject to defensive action possibly in the form of a missile attack in a small sector to the front. In such an instance reflectors 18 and 19 oriented in a forward direction would provide considerable protection. Thus protection in two sectors, one ahead and another astern, would provide a large measure of safety.

Applicants have discovered alternative methods of obtaining much broader coverage than that provided by the 4° two-way beamwidth discussed above. One method is to enhance the effective aperture of the antennas by providing active power gain in the internal path 22 by means of radio frequency amplifiers. A second method is to use a comparatively narrow beam high-gain antenna system and have it passively track the distant enemy radar by making use of a portion of the incident radar energy which appears in the internal path 22. The first method entails more complicated circuitry, expense, and maintenance but can provide broad angular protection from a plurality of radar systems. The second method provides protection from all radars within the usable beamwidth of the antennas but may require additional installations to protect several sectors simultaneously. With the second method it is possible to provide tracking equipment to maintain the antennas 18 and 19 oriented in the direction of the enemy radar system 10 at all times independent of aircraft heading and relative motion of the enemy radar system and the aircraft containing the reflectors or antennas 18 and 19.

For the second method, it is possible by utilizing higher order modes excited in a horn when the angle of incidence of the incoming energy is other than head-on, to utilize a multiple waveguide feed for the horn to derive directional error information. The higher order modes result in phase differences in the signals at various sectors of the base of the horn so that a 4-section waveguide placed at the base of the horn will have relative differences in signals which can be sensed.

A typical horn assembly of FIGS. 5 and 6 contains a hollow pyramidal shaped structure 24 to the apex of which a waveguide structure indicated in general at 25 is connected. The waveguide has a transition portion across which is placed a plurality of parallel plates 26 of lossy material whose purpose is to absorb undesired higher modes of propagation. The waveguide structure 25 contains four component waveguides 27, 28, 29 and 30 which are connected to additional structure in various ways to achieve desired results. The large end of the pyramidal structure is thus a primary aperture and the waveguide end section 25, is a seconary aperture.

A first method of connection of two horns to achieve desired results is shown in FIG. 7. For basic simplicity, the automatic follow-up apparatus is not shown in FIG. 7, it being reserved for the later FIG. 8.

In FIG. 7, signals from waveguides 27 and 28 are applied to a mixer device 31 which by appropriate design can be caused to produce either sum or difference output signals. Typical mixers are well-known in the art, devices known as magic-T, rat-race, hybrid junctions, and the like being indicative of the class of apparatus. In this instance the mixer 31 is a hybrid junction, receiving two separate input signals from the waveguides 27, 28 and providing a "sum" output signal which is delivered to a second similar mixer 32, and a "difference" output signal which is absorbed in a load device 33. In a similar manner, the waveguides 29, 30 are connected to mixer 34, the "sum" output of which goes to mixer 32, and the "difference" output is absorbed by load 35.

Mixer 32 operates in a similar manner to mixers 31 and 34, providing a sum output of all signals from waveguides 27, 28, 29, 30 to line 22, and a difference output between the sum signals from mixers 31 and 34 which is absorbed by load 36.

FIG. 7 contains a second horn 25-A, together with associated equipment similar to that of horn 25 and identified by similar but suffixed reference characters, and which is connected to gyrator 23 through a portion of transmission line 22. Thus a substantial portion of the energy received by one horn or the other finds its way to the opposite horn for reradiation with phase alteration in gyrator 23.

The difference signals absorbed by loads 33, 35, 36, 33-A, 35-A and 36-A actually represent differences in the signals delivered to the four waveguides because of other than direct axial receipt of energy by horns 25 and 25-A. As shown in FIG. 8, this information may be utilized to drive auxiliary orientation apparatus to orient the horns 25 and 25-A to obtain direct axial receipt of the energy from a distant radar set.

In FIG. 8, the loads 33, 35 and 36 are omitted and the "difference" energy which they would have absorbed is supplied to additional mixers for comparison purposes to operate the elevation and azimuth drive mechanism 40 to orient the horns to the direction of receipt of energy. The "difference" output of mixer 31 is connected to mixer 41, to which is also supplied the "difference" output from mixer 34. The "difference" output of mixer 41 is absorbed in load 42 while the "sum" signal therefrom is delivered to balanced mixer 43. The "sum" signal represents the difference between the sum of the signals received by waveguides 27 and 30 and the sum of the signals received by the waveguides 28 and 29 and hence is proportional to the axial misalignment of the antenna in one plane, typically elevation. The balanced mixer 43 compares this signal with the "sum" output of mixer 32 to derive a drive control signal of polarity and amplitude dependency on the direction and magnitude of the antenna misalignment in elevation.

The "difference" output of mixer 32 is a quantity proportional to the difference between the sum of the signals received by waveguides 27 and 28 and the sum of the signals received by waveguides 29 and 30 and hence is proportional to the axial misalignment of the antenna in a second plane, typically azimuth. This quantity is delivered to balanced mixer 44 which also receives the sum output of mixer 32 to provide an azimuth drive control signal of polarity and amplitude dependency on the direction and magnitude of the antenna misalignment in azimuth.

Coupling device 45 is typically a hybrid junction which delivers similar signals to the balanced mixers 43 and 44 while at the same time maintaining matched impedances.

Coupling device 46 has directional coupling properties, that is, it will deliver energy freely from mixer 32 to gyrator 23 and vice versa, but will only deliver energy from mixer 32 to device 45.

The system of FIG. 8 will thus operate to automatically and passively track a distant radar so that signals picked up by antenna 25 are reradiated by antenna 25-A and vice-versa, controlled differential phase shift being produced by gyrator 23. Although at normal ranges parallax is no particular problem with the apparatus of FIG. 8, at close ranges the problem of parallax can be eliminated by separate drive control of the horns 25 and 25-A.

With reference now to FIG. 9 of the drawings, a simplified active system is shown. It has been previously indicated that an active system by reason of its production internally of large quantities of radio frequency energy can provide return of signals over a broad solid angle without requiring the precise angular tracking or stabilization contained in the passive apparatus of FIG. 8. The apparatus of FIG. 9 employs antennas 18 and 19 which possess broad beamwidth and if desired could even be substantially omnidirectional in nature if adequate separation is provided. As with the previously described apparatus, a gyrator 23 is employed to control the amplitude and phasing of return signals from the antennas 18 and 19, the previously described condition still existing, namely that signals received by antenna 18 are reradiated by antenna 19 after substantial amplification and vice versa. Although a single two-way amplifier would be desirable in some instances, it is generally more practical to provide separate amplifiers 63 and 64 for the signals traveling in opposite directions internally between antennas 18 and 19 with suitable hybrid junctions 65 and 66, together with their associated loads 67 and 68 to control the direction of travel of energy within the system. Such hybrid junctions can provide 35 to 40 db isolation between the two amplifiers which is normally adequate to prevent any oscillations around the loop. Since it is desired that the system of FIG. 9 provide protection over a wide range of radio frequencies employed by an enemy radar system, it is preferable that the amplifiers 63 and 64 be broadband, typically traveling wave tube amplifiers.

Ideally, it would be desirable for the separate paths of the signals traveling in different directions internally in the apparatus of FIG. 9 to be as short as possible and identical in length. This requirement normally is not exceedingly difficult when only the passive components of FIG. 9 are considered. However, it is an entirely different matter to maintain such equality with the portion of the internal plumbing which is within the two amplifiers 63 and 64. FIG. 10 contains apparatus which produces automatic control over the electrical length of one of the traveling wave tube amplifiers by varying the beam velocity. In this manner the two amplifiers are always tied together with equal electrical lengths existing.

FIG. 10 employs a local oscillator signal produced by local oscillator 70 having a frequency which is at one end of the system bandwidth. This signal is introduced into both amplifiers 63 and 64 by means of directional couplers typically hybrid junctions 71, 72. Signals of this local oscillator frequency which are amplified by the amplifiers 63 and 64 are selected by bandpass filters 73 and 74 and applied to a balanced mixer type of phase detector 75. The output of the detector 75 is applied to amplifier 64 to control as previously indicated the beam velocity within amplifier 64 and hence its electrical length. Such beam velocity control is well known in the traveling wave tube art. To prevent the emission of any signals of the frequency of the local oscillator 70, the apparatus of FIG. 10 includes local oscillator signal traps 77 and 78 disposed in the signal paths connected to antennas 18 and 19, respectively.

Thus far the proposition has been set forth that jamming of simultaneous lobing radar systems is more difficult than jamming of radar systems employing certain other scanning techniques. This situation, although true with prior art jamming apparatus is not necessarily the situation with the apparatus of the present invention as thus far described. Illumination by the radar system of the target object carrying the security device is normally uniform as regards to angular direction determination apparatus of the simultaneous lobing system, because this illumination is produced by a single transmitting antenna. In the typical sequential lobing system, however, target illumination by the radar transmitter is normally accomplished with different antenna patterns for the alternate or sequentially sampled lobes. In such an arrangement, the target illumination of the jamming system elements is thus dissimilar for the two lobes so that some differentiation as to target position can still be obtained despite the operation of the security device.

Applicants have discovered that the introduction of nonlinearity into the apparatus thus far described will extend the utility of the security device to where it is effective against sequential lobing systems. Such nonlinearity provides a comparatively constant amplitude return signal so that dissimilarity of illumination of the antennas 18 and 19 by the radar system in alternate lobes of the sequential lobing operation will not result in detectable dissimilarities in the return jamming signals from the antennas 18 and 19.

The desired nonlinearity may be introduced in a number of ways. Perhaps the simplest method is that of making the gyrator 23 perform the amplitude control. Such is relatively simple because ferrite materials are typically used in this component. Such ferrite materials exhibit nonlinear properties in certain temperature regions and can provide effective control of the amplitude of return signals. As an alternative, an automatic gain control apparatus can be inserted in the signal path, typically as shown by 24 in FIG. 8.

In those situations where sufficient space is available for the installation of four antennas, certain variations in the system can be made which under certain circumstances may be regarded as simplifications. Reference is now made to FIG. 11 which shows a system interconnected by coaxial cables. The system of FIG. 11 is intended to be used with waveguide fed horns such as those shown by 24 in FIGS. 5 and 6. FIG. 11 is not a tracking system however so that the multiple guide feed as shown in FIGS. 5 and 6 is not necessary. The system envisions each feed box 80, 81, 82, 83 of FIG. 11 being connected to the apex of a separate horn such as that of FIGS. 5 and 6 in place of the multiple system of FIGS. 5 and 6 and in which the higher mode absorptive section is unnecessary. In FIG. 11, the feed box 80 is connected to the feed box 81 by means of a section of coaxial cable 83 in which is connected an amplifier 84. Likewise the feed box 85 is connected to feed box 86 by a coaxial cable 87 in which is connected an amplifier 88. The cables are connected to the feed boxes by some suitable form of terminal arrangement from which the inner conductor is caused to extend into the corresponding feed box an appropriate amount to produce matched coupling between the waveguide form of propagation in the feed box and the coaxial propagation in the cable. Thus, with the feed boxes 80 and 85 connected to horns located for example at one wing tip of an aircraft and the feed boxes 81 and 86 connected to horns located at the other wing tip of the aircraft, signals picked up by the horn connected to feed box 85 will travel through coaxial cable 87 to be amplified by amplifier 88 and retransmitted by the horn connected to feed box 86. Likewise, signals picked up by the horn attached to feed box 81 will travel through coaxial cable 83, be amplified by amplifier 84 and be retransmitted by the horn connected to feed box 80. This system provides relative amplitude control over the return signals typically by adjusting the relative gain of the amplifiers 84 and 88, while the phasing of the rebroadcast signals is provided by reversing the feed to one of the feed boxes, typically feed box 86 which it is noted is fed from the top rather than the bottom as are the other feed boxes. This avoids the difficult problem of reversing conductors in the coaxial feed system and provides uniform phase change for all frequencies of operation. As with the amplifiers of FIGS. 9 and 10, wide band operation is provided by broad band amplifiers such as traveling wave tube amplifiers. With such amplifiers, control of the electrical length of the two paths can be on a design basis such as that of FIG. 9 or on an automatic basis such as with the apparatus of FIG. 10.

FIG. 12 shows the waveguide interconnection of 35, 36, of FIG. 11. The end of each waveguide, 90, 91, 92, 93 is connected to a suitable form of radiator such as a horn. Each waveguide path contains an amplifier 94, 95. One waveguide has a transition section 96 wherein the waveguide rotates through typically 180° to provide the desired phase relationship between the return energy from the two radiators connected to waveguide ends 90 and 93.

FIG. 13 shows a typical illustration of apparatus suitable for use as component 23 in FIGS. 4, 7, and 8–10. This single device provides the 180° phase relationship between return signals from the typical antennas 18 and 19 and control of relative amplitude of return signals from the two antennas. The apparatus includes a section of circular waveguide 101 of such diameter as to support the $TE_{11}$ mode at the frequencies involved. This waveguide is closed at the ends and energy is coupled in or out as appropriate by pairs of coaxial probes at each end identified by numerals 102–103 and 104–105. Probes 102 and 103 are disposed at right angles to each other so that there is no direct coupling therebetween. Likewise probes 104 and 105 are also at 90° relationship to each other. The probe 102 would typically be connected to antenna 18 while the probe 104 would be connected to antenna 19. The pairs of probes 102–103 and 104–105 are placed at a specific angle $\theta_o$ relative to each other which appears as a clockwise angularity of probe 104 as seen from the direction of probe 102. Typically, $\theta_o$ could be 60°.

Disposed within the guide 101 is a section of ferrite 106, which under the influence of a longitudinal magnetic field produced by an electrically energized coil 107, or magnet, placed around the the outside of waveguide 101 produces rotation of the polarization of the energy traveling through the waveguide. With appropriate polarity of the field, energy traveling from probes 102 and 103 will be rotated in a clockwise direction relative to the direction of propagation. For energy traveling in the opposite direction from probes 104 and 105, the actual rotation ($\theta_R$) will be in the same direction, however relative to the direction of propagation it will be counter-clockwise. The exact magnitude of the rotation is dependent upon many factors such as the dimensions of the ferrite 106 and the strength of the magnetic field, however as a typical example a rotation of 80 degrees could be used.

With this apparatus energy applied to probe 102 will be rotated electrically through an angle of $\theta_R$ from which a component having a magnitude proportional to the cosmic of ($\theta_R - \theta_o$) will appear at probe 104. Likewise energy applied to probe 104 will be rotated through $\theta_R$ which is additive with respect to $\theta_o$ so that a component related to the initial energy supplied externally to probe 102 by 180° will be realized. The amplitude of this component will be proportional to the cosmic of ($\theta_R + \theta_o$).

With the availability of output signals at probes 102 and 104, absorption of the quadrature related components is provided by appropriate loads connected to the quadrature probes 103 and 105. The component coupled out of probe 105 will be $E_{102} \sin(\theta_R - \theta_o)$ whereas the component coupled out of probe 103 will be $E_{104} \sin(\theta_R + \theta_o)$.

Obviously many modifications and variations of the present invention are possible in the light of the above teachings. It is therefore to be understood that within the scope of the appended claims the invention may be practiced otherwise than as specifically described.

What is claimed is:

1. In a signal jamming device, first and second transducers physically displaced relative to each other said transducers having substantially identical signal coupling characteristics on the basis of direction to a selected distant object, means for coupling said transducers whereby signals received by one transducer are emitted by the other and vice versa, and differential impedance means connected to said means for coupling for producing phase shift of signals emitted by one transducer relative to signals emitted by the other transducer.

2. In combination, first and second antennas having substantially identical signal response characteristics on the basis of direction to a selected distant object, a transmission line system connected to said antennas whereby external signals received by the first antenna are conducted therethrough in a first direction for transmission by the second antenna and external signals received by the second antenna are conducted therethrough in a second direction for transmission by the first antenna, and a selective phase shifter connected to said transmission line system producing differential phase shift of signals traveling in the first and second directions.

3. In combination, first and second antennas having substantially identical signal response characteristics on the basis of direction to a selected distant object, a transmission line system connected to said antennas whereby external signals received by the first antenna are conducted therethrough in a first direction for transmission by the second antenna and external signals received by the second antenna are conducted therethrough in a second direction for transmission by the first antenna, a selective phase shifter connected to said transmission line system producing differential phase shift of signals traveling in the first and second directions, and amplifier means connected to the transmission line system for amplifying signals passing through said transmission line system.

4. In combination, first and second antennas having substantially identical signal response characteristics on the basis of direction to a selected distant object, a transmission line system connected to said antennas whereby external signals received by the first antenna are conducted therethrough in a first direction for transmission by the second antenna and external signals received by the second direction for transmission by the first antenna, a selective phase shifter connected to said transmission line system producing differential phase shift of signals traveling in the first and second directions, traveling wave tube amplifier means connected to the transmission line system for amplifying signals passing through said transmission line system, and control means connected to the traveling wave tube amplifier means for varying the electrical length thereof.

5. In combination, first and second directional antennas having substantially identical signal response characteristics on the basis of direction to a selected distant object, a transmission line system connected to said antennas whereby external signals received by the first antenna are conducted therethrough in a first direction for transmission by the second antenna and external signals received by the second antenna are conducted therethrough in a second direction for transmission by the first antenna, means connected to said antennas for orienting said antennas to the direction of the source of the external signals, a selective phase shifter connected to said transmission line system producing differential phase shift of signals traveling in the first and second directions, traveling wave tube amplifier means connected to the transmission line system for amplifying signals passing through said transmission line system, and control means connected to the traveling wave tube amplifier means for varying the electrical length thereof.

6. In a signal jamming device, first and second transducers physically displaced relative to each other, said transducers having substantially identical signal coupling characteristics on the basis of direction to a selected distant object, means coupling said transducers whereby signals received by one transducer are emitted by the other and vice versa, and differential impedance means connected to said last named means for producing overall phase shift of 180° in signals emitted by one transducer relative to signals emitted by the other transducer, said differential impedance means further characterized by having amplitude distortion properties.

7. In combination, first and second antennas having substantially identical signal response characteristics on the basis of direction to a selected distant object, a transmission line system connected to said amtennas whereby external signals received by the first antenna are conducted therethrough in a first direction for retransmission by the second antenna and external signals received by the second antenna are conducted therethrough in a second direction for retransmission by the first antenna, a selective impedance device connected to said transmission line system including means for producing overall differential phase shift of 180° in signals of the same frequency traveling in the first and second directions, and non-linear means for producing amplitude distortion of retransmitted signals.

* * * * *